Sept. 30, 1924.
R. E. EDICK
PET COCK
Filed April 12, 1923
1,509,862
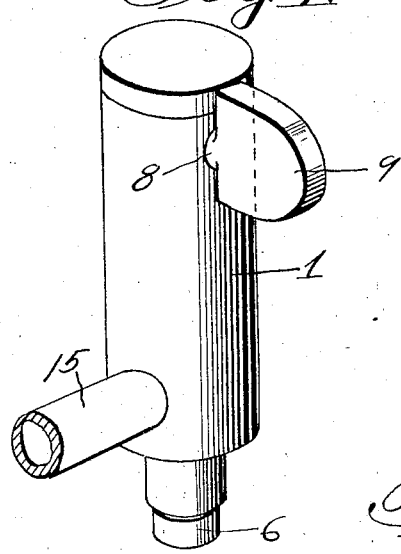
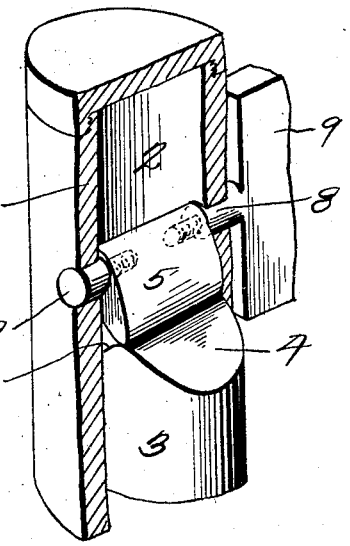
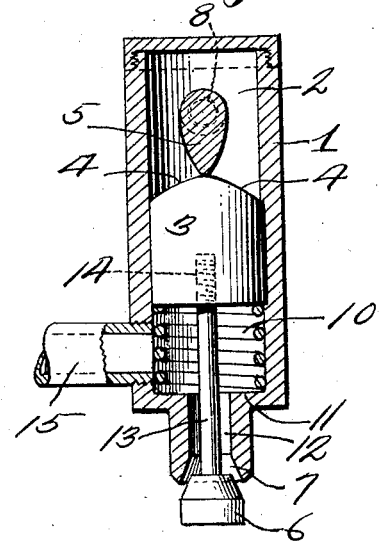
Inventor
R. E. Edick
By D. Swift
Attorney Patented Sept. 30, 1924.

1,509,862

UNITED STATES PATENT OFFICE.

ROY E. EDICK, OF GLADWIN, MICHIGAN.

PET COCK.

Application filed April 12, 1923. Serial No. 631,610.

*To all whom it may concern:*

Be it known that I, ROY E. EDICK, a citizen of the United States, residing at Gladwin, in the county of Gladwin, State of Michigan, have invented a new and useful Pet Cock; and I do hereby declare the following to be a full, clear, and exact description of the invention, such as will enable others skilled in the art to which it appertains to make and use the same.

The invention relates to pet cocks and has for its object to provide a device of this character wherein the valve is automatically closed upon release of the finger engaging member and one wherein the device is substantially self cleaning incident to the movable parts and the seating of the valve.

A further object is to provide a pet cock comprising a casing, a member slidably mounted in the casing and having its inner end provided with oppositely bevelled surface with which a cam cooperates for moving the member outwardly against the action of a coiled spring, a valve stem carried by the slidable member and extending through a discharge port, and a frusto conically shaped valve carried by the valve stem and cooperating with a valve seat carried by the discharge port.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of a pet cock.

Figure 2 is a vertical transverse sectional view through the pet cock.

Figure 3 is a detail perspective view of the pet cock, parts of the casing broken away to better show the structure.

Referring to the drawing, the numeral 1 designates the cylindrical casing of the valve in a round chamber 2 of which is slidably mounted a cylindrically shaped member 3, which cylindrical member, when moved in the casing tends to dissolve any solidified material therein, and prevents solidified material from sticking the valve. The upper end of the cylindrical member 3 is provided with oppositely disposed bevelled surfaces 4, with which surfaces the cam 5 cooperates for unseating the conically shaped valve 6 from the valve seat 7. The cam 5 is provided with pintles 8 having bearings in the casing 1, and one of said pintles is provided with a finger engaging member 9, which when rotated rotates the cam 5 for forcing the cylindrical member 3 downwardly against the action of the coiled spring 10 which is interposed between the lower end of the member 3 and the bottom 11 of the chamber 2. It will be seen that the coiled spring 10, when compressed, will also prevent solidification of material within the chamber incident to collection of sediment therein, and that whatever sediment, when dislodged by the action of the moving parts, will pass through the discharge ports 12, will also pass the valve 6, which valve is carried by the valve stem 13. The valve stem 13 extends axially through the discharge port 12 and is connected at 14 to the cylindrically shaped member 3, thereby allowing the device to be assembled. It will be seen that the coiled spring 10 will automatically close the valve immediately upon release of the finger engaging member 9, thereby preventing an operator from leaving the pet cock turned on inadvertently, as is now the common difficulty with pet cocks of conventional forms. By providing a self cleaning pet cock, it is obvious that the difficulty incident to clogging of the small ports therein is overcome, and that the conically shaped valve will readily seat in the valve seat 7 in such a manner that the valve may be easily reached as well as the valve seat for cleaning or regrinding purposes.

From the above it will be seen that a pet cock is provided, which is self closing and self cleaning, and one wherein the parts have been reduced to a minimum thereby insuring positive operation and cheapness of construction.

Fluid enters the chamber of the valve casing 1 at a point below the cylindrical member 3 and through a pipe 15.

The invention having been set forth what is claimed as new and useful is:—

A pet cock comprising a casing, a member slidably mounted within a chamber of the casing, the upper end of said member having oppositely disposed bevelled walls, a rotatable cam disposed within the chamber and cooperating with said bevelled walls, the lower end of the casing terminating in a reduced portion having a discharge port therethrough, a valve stem carried by the slidable member and extending axially through the discharge port out of engagement therewith, the lower end of the valve stem being provided with a conically shaped valve cooperating with a valve seat carried by the lower end of the extension, an intake port extending through the casing adjacent the lower end thereof and below the slidable member, and a coiled spring interposed between the lower end of the slidable member and the bottom of the chamber, said slidable member and the coiled spring forming the only support for the stem and valve.

In testimony whereof I have signed my name to this specification in the presence of two subscribing witnesses.

ROY E. EDICK.

Witnesses:
  EDW. RUTTAN,
  CLAIRE EDICK.